Inventor:
Robert F. Wood,
by Merton D. Morse
His Attorney.

Inventor:
Robert F. Wood,
by Merton D Morse
His Attorney.

March 28, 1950 R. F. WOOD 2,502,195

SYNCHRONIZING SYSTEM

Filed May 1, 1946 3 Sheets-Sheet 3

Inventor:
Robert F. Wood,
by Merton D. Morse
His Attorney.

Patented Mar. 28, 1950

2,502,195

UNITED STATES PATENT OFFICE 2,502,195

SYNCHRONIZING SYSTEM

Robert F. Wood, Bridgeport, Conn., assignor to General Electric Company, a corporation of New York Application May 1, 1946, Serial No. 666,275

9 Claims. (Cl. 178—69.5)

This invention relates to television and more particularly to reconstituting a multicolor television visual program.

In one method of color television, the visual program is successively scanned through a group of color filters each of which represents one primary color, thus producing a visual signal corresponding successively to the various color components of the visual program. These signals are caused to modulate a radio frequency carrier wave which is picked up in the television receiver and detected to produce a unidirectional signal voltage corresponding to the visual program. The latter signal is then caused to produce an image in various intensities of white light on a viewing screen and color filters successively introduced between the observer and the image to reproduce the successive images in their true color. Inasmuch as this scanning takes place at a rapid rate compared to the persistence of human vision, the successive color images are merged into a single multicolor reproduction of the visual program.

Faithful reproduction of the visual program in its true color demands that the successive color images seen by the observer correspond in color to the color filter interposed at the television transmitter. It is therefore necessary that the successive color filters introduced between the observer and the image at the television receiver be synchronized with transmitter operation. In one system of reproduction this is accomplished by providing a rotatable disk having segments of color filter material arranged in sequential order corresponding to the color sequence scanned by the television transmitter. This disk is then rotated in synchronism with the scanning by the television transmitter to achieve the desired reproduction.

It is an object of my invention to provide improved means to synchronize the rotation of the color disk in a television receiver with the synchronizing signals from the transmitter.

It is a further object of my invention to provide accurate and stable means to synchronize the rotation of the color disk in a television receiver, which means are adapted to the use of standard and reliable circuit components and which does not interfere either with the operation of the television receiver or with the mechanical system for rotating the disk.

Yet another object of my invention is to provide an improved synchronizing system for a color television receiver in which the color disk is synchronized automatically even though the rotational velocity thereof differs from that corresponding to synchronism by a relatively large value.

Still another object of this invention is to provide improved means to synchronize the rotation of an object in phase and frequency with respect to periodic voltage pulses so that at the instant of each pulse the object has a predetermined angular position.

Figure 9:
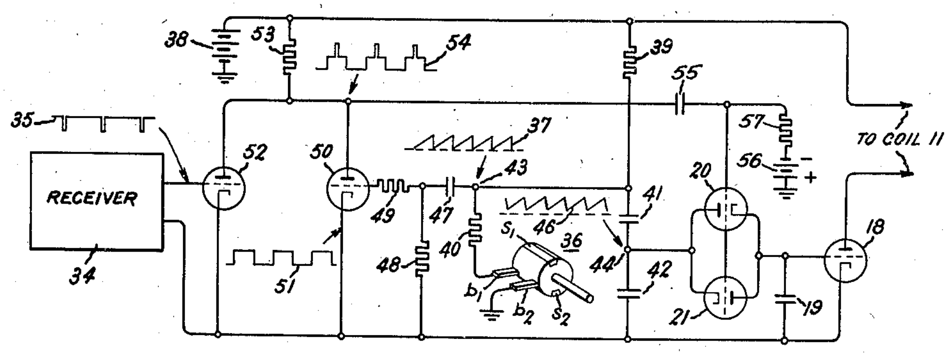
Figure 10:
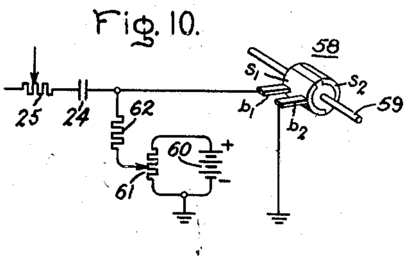
Figure 11:
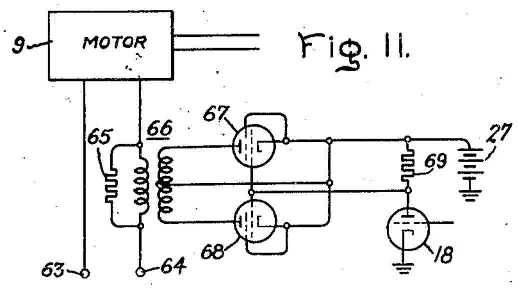

The novel features which I believe to be characteristic of my invention are set forth with particularity in the appended claims. My invention itself, both as to its organization and method of operation may best be understood by reference to the following description taken in connection with the accompanying drawings in which Fig. 1, shows a diagrammatical view of my improved synchronizing system, Figs. 2–8 show the performance of the system under various conditions, Fig. 9 shows an alternate embodiment thereof, Fig. 10 shows an application of this invention to a mechanical synchronizing system, and Fig. 11 shows an alternate method of controlling motor speed by the apparatus of this invention.

Figure 1:
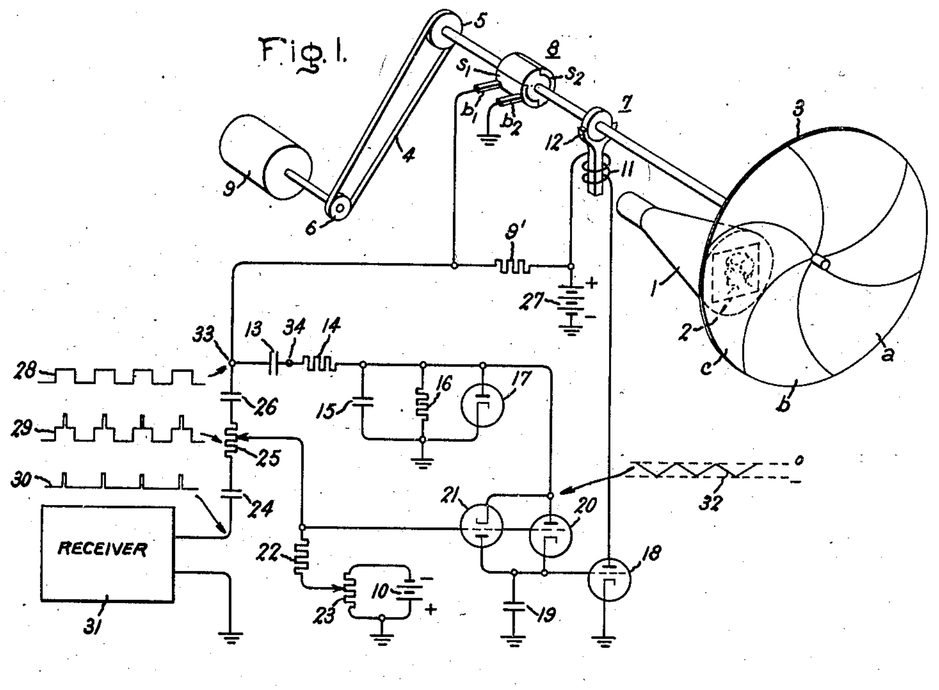

Referring now to Fig. 1, 1 represents a cathode ray tube which is connected to a television receiver to produce a television image in varying intensities of white light on viewing screen 2. This image corresponds to the visual program transmitted by a color television transmitter and consists of successive images, each representing the color content of visual program from the standpoint of one primary color. Between the observer and the viewing screen, color disk 3 is provided. This disk has a plurality of segments *a*, *b*, *c*, etc. These segments are constructed of transparent material, the color of each segment being such that when image 2 is viewed therethrough the image appears to contain only the desired primary color. The segments of disk 3 are arranged in order such that when the disk is rotated the filters successively interposed between the observer and the viewing screen correspond to the same color sequence as the television transmitter. Hence when disk 3 is rotated in synchronism with the scanning of the television transmitter, the image 2 appears successively to contain each of the three primary colors corresponding to the scanning of the television transmitter. These are blended in the eye of the observer to produce a single multicolor image.

The mechanical system comprising belt 4, pulleys 5 and 6, disk brake 7, commutator 8 and motor 9 provides mechanical rotation of color disk 3. The relative diameters of pulleys 5 and 6 are chosen such that in the absence of retarding torque due to the action of brake 7, disk 3 is rotated at an angular velocity slightly in excess of the velocity corresponding to the color image scanning operations at the transmitter. In a preferred embodiment of this invention, for example, motor 9 is a single phase induction motor connected to a source of alternating voltage originating in a public utility system so that as the retarding torque is reduced it inherently tends to operate at a synchronous speed value that is accurately determined by reason of the high degree of frequency stability of the alternating voltage source. At the same time, however, small changes in the rotational velocity of the motor can be obtained by changing the mechanical load, as for example, by operation of brake 7. This results from the well known fact that the slip (and hence rotational velocity) of an induction motor varies with load torque. The maximum torque associated with operation of brake 7 is made sufficient to reduce the rotational velocity of motor 9 to a value slightly less than the velocity corresponding to the scanning action of the television transmitter. Thus, by controlling the torque exerted by brake 7, the color disk 3 can be brought to synchronism with the scanning operations of the television transmitter.

Unit 31 represents a television receiving system with means to separate the recurrent color synchronizing signals corresponding to the instants the color cycle is commenced. In one method of color television, for example, a group of periodic bursts of radio frequency energy are transmitted for a short interval before the video signal corresponding to the first color of the color cycle. These pulses are converted in the receiver to magnitude variations of a unidirectional voltage wave and this wave applied to a circuit sensitive only to pulses having the repetition rate of these bursts and producing a single voltage pulse when a group of pulses of this character are applied. Such a circuit might, for example, consist of a resonant circuit having resonant frequency corresponding to this repetition rate, together with a trigger circuit to produce a pulse when the successive bursts build the voltage across this circuit to a predetermined value. Thus a succession of pulses appear at the output of unit 31, each signifying the instant the color scanning cycle is to be commenced. If, for example, the color cycle consists of scanning to produce successive signals corresponding to the red, blue, and green color content of the visual program, and the cycle commences with the red color, each pulse of wave 30 corresponds with the instant the red color filter is desired to be interposed between the observer and the image 2.

It is the purpose of commutator 8 and the circuits including electron discharge devices 17, 18, 20 and 21 to actuate disk brake 7 in such manner as to maintain the rotational velocity and phase position of disk 3 in synchronism with the scanning operations of the color television transmitter. Commutator 8 includes two conducting segments, $s_1$ and $s_2$ oppositely disposed on the periphery thereof, each segment extending, for example, over one fourth of the circumferential surface of the commutator. Brushes $b_1$ and $b_2$ ride on commutator 8 in such manner that when either segment is underneath them a conducting path is produced therebetween, thus electrically connecting point 33 to ground. However, when neither segment $s_1$ and $s_2$ is under brushes $b_1$ and $b_2$, no conducting path is provided and point 33 is permitted to reach a voltage value determined by the potential of source 27 by reason of the connection thereto through resistance 9'. Hence commutator 8 produces rectangular wave voltage 28 at point 33, the minimum value of this voltage being zero and the maximum value being the positive voltage of source 27. Inasmuch as two commutator segments are provided, wave 28 goes through two cycles for each cycle of rotation of commutator 8 and disk 3. However, disk 3 has two complete color disk groups so that each cycle of wave 28 in reality corresponds to one color group sequence so far as an observer viewing image 2 is concerned. The segments of commutator 8 are angularly disposed with reference to disk 3 so as to cause the midpoint of the positive portion of the wave 28 to correspond with the instant a color sequence is commenced. If, for example, the color sequence of the scanning operations of the television transmitter is red, blue, green, and wave 30 produces a pulse each time a video signal corresponding to the red color content of the visual program is commenced, then commutator 8 is arranged so that the midpoint of wave 28 corresponds to the instant a red color filter is interposed before viewing screen 2.

Voltage from point 33 is applied through capacitor 26 to one terminal of potentiometer 25 whereas voltage from unit 31 is applied through capacitor 24 to the other terminal of potentiometer 25. This produces a composite voltage at the moving terminal of potentiometer 25 having wave shape corresponding to the combined voltages 28 and 30. If, for example, these two voltages are synchronized in frequency and each pulse of wave 30 occurs at the center of the positive pulse of wave 28, a voltage wave having shape shown at 29 is produced at the moving terminal of potentiometer 25, the relative magnitude of the voltage components of wave 29 being adjustable by varying the position of the moving contact of potentiometer 25.

The voltage at the moving terminal of potentiometer 25 is applied to the control electrodes of electron discharge devices 20 and 21. A unidirectional bias voltage is simultaneously applied to these control electrodes by the circuit comprising potentiometer 23, resistance 22, and unidirectional voltage source 19. The value of this constant bias voltage is chosen to bias devices 20 and 21 beyond space current cut-off to such degree that conduction in either device can be obtained only if the positive voltages of waves 28 and 30 combine to produce the large positive voltage peaks shown in wave 29. Hence, devices 20 and 21 are rendered conducting only at the instant positive pulses exist on wave 30 and then only if these pulses take place at a time when wave 28 has a positive value. The exact method whereby this bias is developed at both device 20 and device 21 will be described in further detail hereafter.

Cathode-anode space path voltage for devices 20 and 21 is obtained from point 33 by the network comprising resistances 14 and 16 and capacitors 13 and 15, condenser 13 acting as a blocking condenser to cause voltage at point 34 to have the A.-C. components of voltage at point 33 without the D.-C. components thereof. Resistance 14 and condenser 15 integrate the voltage of point 34, thus producing across condenser 15 a triangular voltage wave. This wave is applied to the elements of diode electron discharge device 17 which causes the D.-C. component thereof to be of such value as to prevent appreciable positive voltage at any point in the cycle. The positive portion of the voltage cycle is minimized by choosing resistance 16 to have a relatively large value.

At the instant devices 20 and 21 are rendered conducting by the applied voltage pulses of wave 29, condenser 19 is charged until the voltage thereacross equals the instantaneous anode voltage of device 17. At this time no further charging action takes place inasmuch as the total space path voltage at these devices is then zero. When the peak of the voltage wave 29 disappears, devices 20 and 21 are biased beyond cutoff and the charge on capacitor 19 remains constant until the next voltage peak in wave 29 permits charge of this capacitor to the potential at the anode of device 17 at that time. Hence, capacitor 19 remains at a constant voltage value after each instant a pulse of wave 30 corresponds in time with the positive portion of wave 28 and retains this voltage until this event again takes place.

Proper operation of the circuit of Fig. 1 requires that devices 20 and 21 be biased beyond cathode-anode space current cut-off at all times when the pulses of wave 30 do not coincide with the positive portion of the rectangular wave 28. The most severe condition in this respect from the standpoint of device 20 exists when condenser 19 has charge corresponding to the maximum negative value of wave 32, the instantaneous voltage of wave 32 is zero, and the positive pulse portion of wave 28 appears at the control electrode of device 20. To avoid conduction through device 20 under these conditions, it is necessary that the negative voltage applied to the control electrode from potentiometer 23 exceed the value corresponding to the sum of one half the rectangular wave portion of wave 29, the maximum value of wave 32, and the cathode-control electrode space path voltage required to produce cutoff in device 20 when the cathode-anode space path voltage is equal to the maximum value of wave 32. Similarly, the most severe condition from the standpoint of device 21 is that existing when condenser 19 is uncharged, wave 32 has maximum negative value, and the positive portion of wave 28 is applied to the control electrode of device 21. This requires the same value of bias voltage at potentiometer 23 as is required to prevent space current flow in device 20 under the previously described set of conditions.

In addition to preventing space current flow in devices 20 and 21 when the pulses of wave 30 do not coincide with the positive portion of wave 28, it is also necessary that one of devices 20 and 21 be in a conducting condition for the duration of pulses 30 when the pulses of wave 30 do coincide with the positive portion of wave 28. The most severe condition in this respect from the standpoint of device 20 is that existing when the pulse of wave 30 takes place at the instant of maximum positive voltage of wave 32, and the condenser 19 has almost no charge. In this case conduction through device 20 requires that the potential of the control electrode of that device be equal to ground potential. Similarly, the most severe condition in this respect from the standpoint of device 21 exists when the pulse of wave 30 takes place at the instant of a very small negative voltage at wave 32 and condenser 19 has zero charge. Again the voltage applied to the control electrode of device 21 must be zero to cause conduction.

The requirements of the above two paragraphs are not independent insofar as selection of voltages of waves 28, 30 and 32 are concerned. It can be shown, however, that so long as the voltage of wave 32 is less than the voltage of the pulses of wave 30 actually appearing at the control electrodes of devices 20 and 21, a value of unidirectional bias voltage applied from source 10 may be found to cause the system to operate as required. It will, of course, be obvious to those skilled in the art that if the voltage of wave 30 appearing at the output of unit 31 is not sufficient to meet this condition, one or more amplifiers may be inserted into the system to achieve the necessary value.

The voltage of condenser 19 is applied to control the mechanical torque of brake 7 by means of electron discharge device 18. The cathode-anode space path of this device is connected through unidirectional voltage source 27 to operating coil 11 of brake 7. Inasmuch as the space current flow through device 18 varies in accordance with the charge on condenser 19, the force on shoe 12 of brake 7 varies accordingly, thereby altering the frictional force of brake 7 and accelerating or decelerating the mechanical system accordingly.

It will be observed that the value of voltage wave 32, Fig. 1, when wave 28 has minimum voltage, is not material so far as circuit operation is concerned. This results from the fact that the pulses of wave 30 do not render devices 20 and 21 conducting unless they take place during the maximum voltage period of wave 28 and consequently condenser 19 cannot be charged to the voltage of wave 32 at the time of the minimum voltage portion of wave 28.

Figure 2:
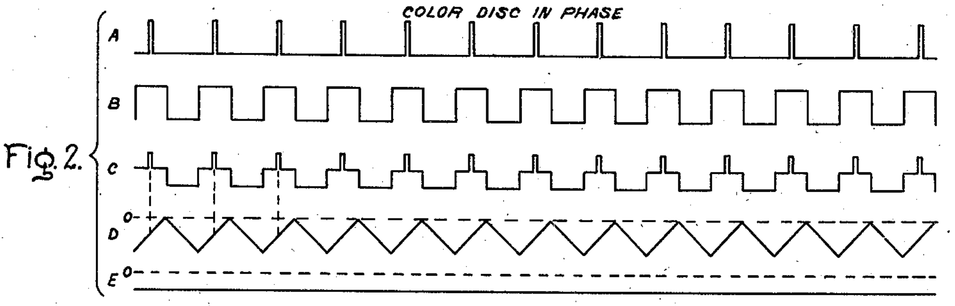

Figs. 2–8 show the operation of the system of Fig. 1 under various conditions. In Fig. 2, curve A shows the output voltage from device 31, this voltage being a succession of positive voltage pulses occurring at a rate determined by the color scanning rate of the television transmitter. Curve B shows the voltage at point 33, Fig. 1, for the case wherein color disk 3 is synchronized in frequency and phase position with the operation of the television transmitter. The combined voltage applied to the control electrodes of devices 20 and 21 is shown in curve C whereas the voltage at the anode of diode 17 is shown in curve D. The resultant voltage across condenser 19 for this case is of constant value inasmuch as the voltage of curve D has the same value at the instant of each pulse of curve A. Since curve D is negative with respect to ground voltage, condenser 19 is charged to a negative voltage with respect to ground. This voltage is shown in curve E.

Figure 3:
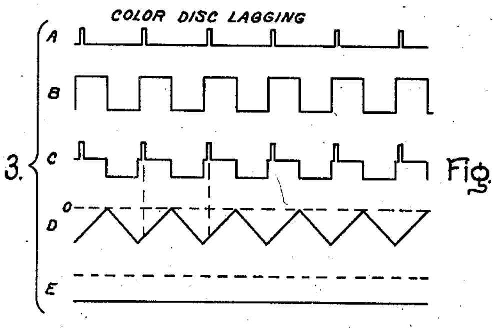
Figure 4:
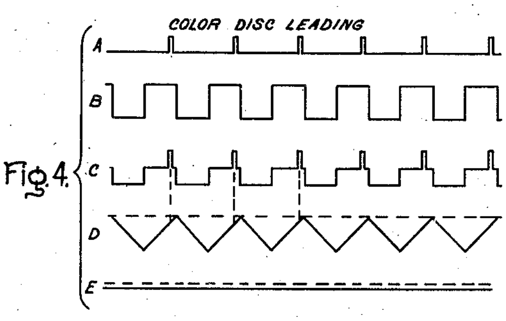

Fig. 3 shows the electrical conditions within the system of Fig. 1 for the case of color disk 3 lagging in phase position with respect to the operation of the television transmitter. Fig. 4 shows corresponding conditions for the case of color disk 3 leading in phase position the operation of the television transmitter. In the case of Fig. 3, the rectangular voltage of curve B does not reach the mid-point of its cycle before the pulses of curve A take place so that the wave shape shown in curve C is applied to the control electrodes of devices 20 and 21. At the instant the pulses of curve A occur, curve D has a greater negative voltage than at the corresponding time of Fig. 2, thus charging condenser 19 to a greater negative value through electron discharge device 21. This produces the constant negative voltage shown in curve E. Inasmuch as this voltage is of greater negative value than the voltage shown in Fig. 2, a smaller space current flow takes place through device 18 and a smaller energizing current flows through operating coil 11 of brake 7, thereby reducing the load torque on motor 9 and causing the rotational velocity of this motor to increase. Similarly, in the case of Fig. 4, the rectangular wave B leads its normal phase position and the pulses of curve A do not appear until after the mid-point of curve B. Hence, curve D has a smaller negative voltage at the instant each pulse of curve C appears and a correspondingly small negative charge is placed on condenser 19. This increases the space current flow in device 18, thereby increasing the mechanical torque exerted by brake 7 and decelerating the mechanical system accordingly.

Figure 5:
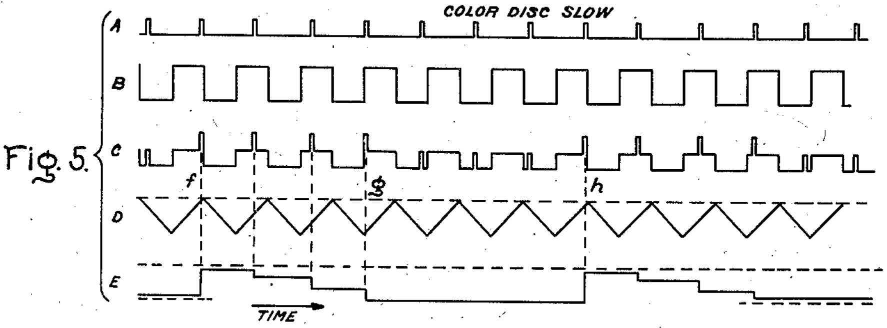
Figure 7:
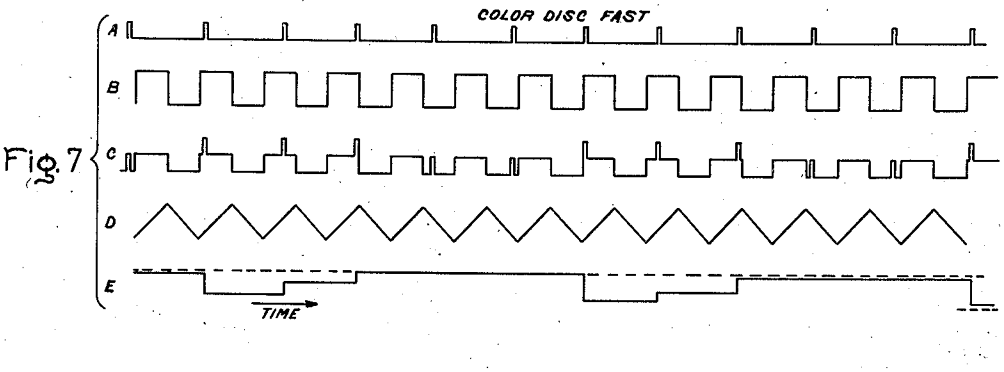

Figs. 5 and 7 show the performance of the system of Fig. 1 for the case of color disk 3 operating at a speed slower than synchronized speed and a speed faster than synchronized speed respectively. In the case of Fig. 5, curve B requires a greater period of time per cycle than curve A so that the pulses of curve A appear at earlier portions of the cycle of curve B as time progresses. This is shown in the wave shape of curve C since at point *f* the pulse of curve A takes place at the trailing edge of the positive portion of curve C and at point *g* this pulse takes place at the leading edge of the positive portion of wave C. At point *f*, for example, wave D has a relatively small negative voltage so that condenser 19 has a relatively small negative charge, thereby causing a relatively large space current flow through device 18 and a correspondingly large torque of brake 7. At the next pulse of curve A, wave D has a greater negative potential and a correspondingly increased negative charge is placed on condenser 19 so that a smaller torque is applied by brake 7. The next pulse produces an even greater negative charge and further reduces the braking torque. At point *g*, wave D has maximum negative potential so that current flow through device 18 has minimum value and the retarding torque due to brake 7 is the smallest possible value. Between time *g* and time *h* the pulses of wave A take place during the zero potential portion of wave B and the two waves do not combine to produce a sufficient voltage to render electron discharge devices 20 and 21 conducting. Hence, the relatively large negative charge on condenser 19 continues until time *h* at which time a very small negative charge is placed thereon and the cycle repeated.

Figure 6:
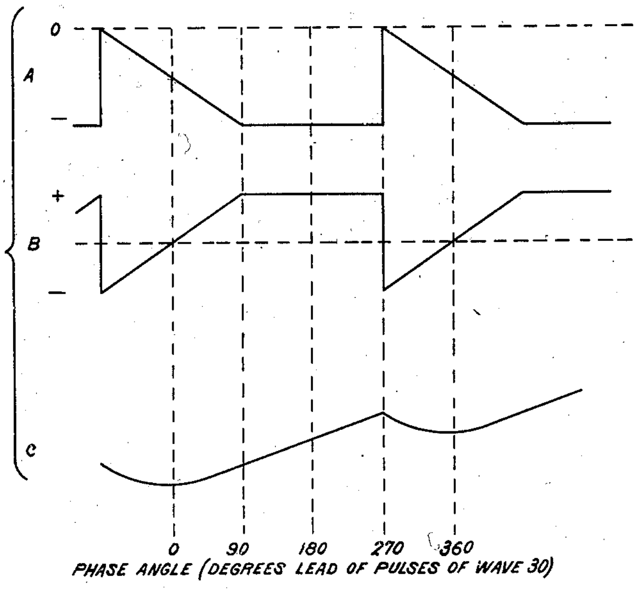

The method whereby motor 9 is given a net accelerating torque when disk 3 is rotating at a lower velocity than that corresponding to the synchronizing pulses of wave 30 may best be understood by considering the condition wherein motor 9 is only slightly below the synchronous velocity. In this case each successive pulse of wave 30 appears at a slightly greater angle of lead with respect to the rectangular wave form at point 33. The change in phase position at successive pulses of wave A is then so small that the variations in charge on condenser 19 can then be considered as a continuous curve and the net effect of operation of the control system evaluated by considering the overall torques acting on the mechanical system during one complete cycle of phase difference. Fig. 6 shows such a cycle. When the pulses of wave 30 occur exactly in the center of the positive portion of wave 28 (phase angle = 0), the voltage at condenser 19 and the control electrode voltage at device 18 corresponds to half the peak negative value as shown in Fig. 6, curve A. As the pulses of wave 30 begin to lead the center point of the positive portion of the wave 28 (phase angle increases), successively greater values of negative charge are placed on condenser 19 inasmuch as wave 32 becomes increasingly negative. However, when the 90° phase lead is reached, the pulses of curve 30 no longer correspond with the positive portion of wave 28 and devices 20 and 21 are biased beyond cut-off, thus causing condenser 19 to retain the charge corresponding to 90° lead until the 270° phase lead position is reached. The charge on condenser 19 is then suddenly reduced to a very low value as at this point wave 32 is at practically zero potential. As the pulses of wave 30 continue to lead wave 28 by greater angles the negative charge on condenser 19 is increased until the pulses are again in phase and the cycle is repeated. Increased negative charge on condenser 19 reduces the space current flow in device 19 and decreases the retarding torque of brake 9, thereby increasing the excess torque in motor 9 available to accelerate the system. Curve B, Fig. 6, shows this torque, positive values of torque corresponding to acceleration. The resultant speed of motor 9 and disk 3 is shown in curve C, Fig. 6, this speed varying in accordance with the torque. It is evident from curve C that over the complete cycle a net accelerating torque is developed and accordingly the motor speed is changed in a direction tending to increase that speed and bring the system into synchronism.

When the speed of motor 9 is considerably below the speed corresponding to synchronism, the charge on condenser 19 is charged in steps as shown in Fig. 5, curve E. However, the charge left on condenser 19 during the zero voltage portions of the wave B will be at a greater than normal negative value. The mechanical system is accordingly given a net acceleration over this period of time and the rotational velocity of disk 3 thus changed in a direction to provide synchronism.

Figure 8:
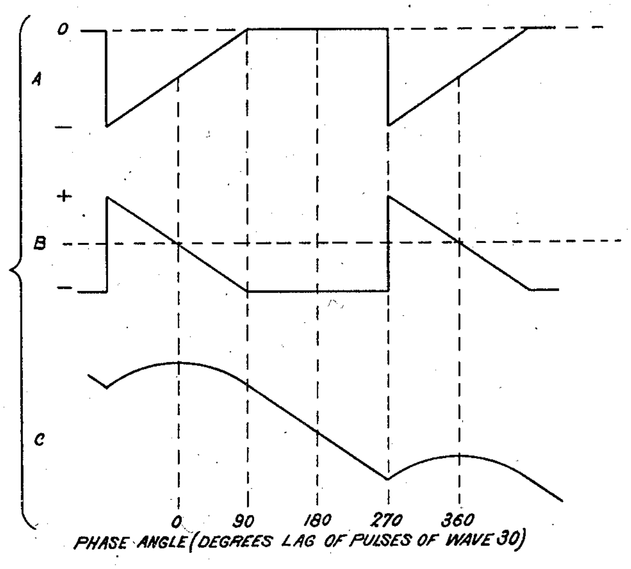

Figs. 7 and 8 corerspond to Figs. 5 and 6 except that the conditions correspond to rotation of the color disk at a more rapid velocity than that corresponding to synchronism. As shown in curve C, Fig. 7, the pulses of wave A appear at successively later positions in the cycle of wave B when this condition exists, thus causing the system to go through the cycle of phase relation in the opposite direction to that of Figs. 5 and 6. The operation of the system at small error in velocity may be evaluated by considering conditions over a complete cycle as wave A produces pulses at slowly increasing time lag (greater lagging phase angles) with respect to wave B. The resultant voltage at condenser 19 is shown in curve A, Fig. 8, and the corresponding torque of brake 7 in curve B, positive values of torque corresponding to acceleration of disk 3 and negative values of torque corresponding to deceleration. The resultant speed of disk 3 is shown in curve C, Fig. 8, and shows a net decrease over the complete cycle, a speed change in the correct direction to restore synchronism.

From the above description it is evident that the control mechanism of Fig. 1 operates to cause the color disk to be brought into synchronism even though the rotational velocity thereof differs from the synchronous velocity. As the system brings the disk closer and closer to the correct velocity, the control acts more and more as if the only error is in the phase position of the disk and the system is finally brought into step by the mechanism described above with respect to Figs. 3 and 4.

It will be recognized, of course, that the tendency of the system of Fig. 1 to restore synchronism in rotational velocity varies with the relative value of actual rotational velocity and the synchronous value. In general, the synchronizing tendency is maximum as the actual velocity approaches the synchronous velocity and drops off as these two values deviate from each other. In fact, if the deviation is sufficiently great, the system may lose synchronizing power altogether and even cause synchronism at the wrong rotational velocity. One such velocity exists if the color disk is rotating at one half the synchronous velocity for in this case half the pulses of wave 30 exert no influence on the system and it operates just as if synchronism prevails. For this reason, it is preferable to use a motor 9 having an inherent characteristic tending to cause rotation of disk 3 at a velocity close to synchronism. The induction type motor is particularly suitable for this purpose inasmuch as it operates at only a few percent slip even during mechanical overload and consequently always operates within the region wherein the control system is most effective in achieving exact synchronous speed. This type motor has the further advantages of low cost, reliability, and freedom from operational noise and vibration.

The above performance is in marked contrast to the operating characteristics of synchronizing systems that operate only to correct errors in the phase relation of the angular position of the color disk with the synchronizing pulses. In a television receiver employing these systems it is possible to lose synchronism to such a degree while tuning from one transmitting station to another that manual control must be used to restore the rotational velocity and permit the phase synchronizing action to become effective. In the case of receivers constructed in accordance with this invention, this possibility is avoided since the synchronizing system is operable when the error is in frequency as well as phase.

Fig. 9 shows a modification of the control system of Fig. 1. In this modification, 34 represents a television receiver equipped with means to isolate the color synchronizing pulses and producing a voltage wave having a negative pulse in the instant of each color pulse, this wave being shown at 35. Instead of commutator 8, Fig. 1, commutator 36 having a conducting period for only two very small portions of the cycle of rotation is used in the system of Fig. 9. Construction of commutator 36 corresponds with that of commutator 8 except that the segments $s_1$ and $s_2$ have a relative small circumferential length. When commutator 36 is in the non-conducting condition, a positive voltage appears thereacross, this voltage being due to unidirectional voltage source 38 acting through resistance 39. When commutator 36 is in the conducting condition, no voltage appears thereacross. Condensers 41 and 42 are in series connection between point 43 and ground and have a relatively long charging time through resistance 39 from source 38 as compared with the rotational velocity of commutator 36. Hence, when commutator 36 is in the opened condition condensers 41 and 42 slowly charge, thus producing triangular waves 37 and 46 at points 43 and 44 respectively. When commutator 36 is in the conducting condition, condensers 41 and 42 discharge through resistance 40. This discharge is quite rapid by reason of the relatively small value of resistance 40, this value being only sufficient to prevent excessive current flow in commutator 36.

The voltage of wave 37 is applied to the control electrode of electron discharge device 50 through resistances 48 and 49 and capacitor 47 to produce a rectangular wave current flow therethrough, this wave having the general shape shown in wave 51. Operation of this circuit is as follows. Capacitor 47 is chosen of sufficiently large value so that the voltage thereacross does not change significantly during successive cycles of wave 37. Hence, the unidirectional component of the voltage at the junction of resistance 49 and condenser 47 adjusts itself until the charging action when wave 37 is above average value is equal to the discharging action when wave 37 is below average value. This requirement is fulfilled when the average voltage at this junction is zero. Thus, the control electrode of device 50 is driven in the positive direction over half the cycle of wave 37 and in the negative direction over the other half. However, due to the effect of control electrode-cathode space current flow on the positive half of the cycle, the control electrode of this device can only reach a limited positive potential and it accordingly acts as a limiting amplifier. On the negative portions of the cycle, the control electrode quickly reaches the cut-off value, thus producing the rectangular space current wave form shown at 51.

The voltage wave 35 is applied to electron discharge device 52 thus to cause a space current flow through that device to vary in accordance therewith. Space current in devices 50 and 52 flows through resistance 53 to produce a voltage drop thereacross corresponding to the combined currents, this voltage having the wave shape shown at 54. The wave 54 is applied through condenser 55 to the control electrodes of electron discharge devices 20 and 21. These devices are normally biased beyond the cut-off point by means of unidirectional voltage source 56 and resistance 57 and do not conduct unless the pulse of wave 35 corresponds with the minimum current flow condition at device 50, this being accomplished by choice of circuit constants in the manner described above with reference to Fig. 1. In particular condensers 41 and 42 are chosen of such value as to cause wave 46 to be of smaller peak magnitude than the pulses of wave 54.

Electron discharge devices 20 and 21 charge condenser 19 during their conducting condition in the same manner as above described with reference to the system of Fig. 1, thus producing a negative charge on that condenser having value determined by the relative phase positions of the pulses of curves 35 and 37. This alters the cathode-control electrode voltage of electron discharge device 18 thus varying the current flow in coil 11 and altering the torque on the mechanical system in a direction to achieve synchronism in both phase and frequency, this action taking place in the same manner as described above with reference to Fig. 1.

The voltage of wave 46, Fig. 9, is significant only during the portion of the cycle when the rectangular wave component of wave 54 is positive. At all other times, devices 20 and 21 cannot be rendered conducting by the pulses of wave 35 and the voltage of wave 46 has no influence on system performance.

While I have described my invention with reference to the particular problem of synchronizing the rotation of the color filter disk in a television receiver, it will be evident to those skilled in the art that the principles thereof may be applied to other situations wherein it is desired to achieve mechanical rotation in accordance with an electrical signal. In general, the system may be applied whenever voltage pulses corresponding to desired successive equally spaced angular positions is available. Such a system might, for example, be used where it is desired to rotate one body in synchronism with another. In this case, a controlling voltage of the wave shape 30, Fig. 1, can be generated by use of a commutator on the controlling shaft and this wave fed into the control system of Fig. 1 just as in the case of wave 30. The system of Fig. 1 will then maintain rotation of commutator 8 in accordance with the voltage of wave 30 and thus achieve the desired synchronism. One circuit for achieving this performance is shown in Fig. 10. In this figure, commutator 58 is mounted on shaft 59 desired to be followed and brushes $b_1$ and $b_2$ connected to unidirectional voltage source 60 through resistances 61 and 62 so that when the commutator provides a non-conducting path a positive voltage appears at the common terminal of condenser 24 and resistance 62. By arranging segments $s_1$ and $s_2$ of commutator 55 to cover nearly all the periphery thereof, a voltage wave similar to wave 30 is produced, this wave having frequency and phase position determined by the angular position of shaft 56 and being introduced to the system through condenser 24 and resistance 25 in the same manner as wave 30 of Fig. 1.

Fig. 11 shows an alternate method of controlling motor speed in response to the control voltage developed by the circuits of this invention. This method is described and claimed in the copending application of R. B. Dome, S. N. 666,277, filed on May 1, 1946, and assigned to the same assignee as the present application. Briefly, variations in the control electrode-cathode voltage of device 18 take place in accord with the relative angular velocity and phase position of the color disk and the synchronizing pulses as described above with reference to Fig. 1. These variations alter the current flow in resistance 69, thereby altering the control electrode-cathode space path voltage in thyratron devices 67 and 68. This voltage determines the instant in the voltage cycle of the secondary of transformer 66 at which these devices commence conduction and consequently establishes the effective parallel impedance of resistance 65 and the primary winding of transformer 66. The voltage applied to motor 9 is thereby varied with respect to the voltage across terminals 63 and 64, thus causing motor 9 to accelerate or decelerate and bringing the color disk into synchronism.

While I have shown and described particular embodiments of my invention, it will be obvious to those skilled in the art that changes and modifications may be made without departing from my invention in its broader aspects. In particular, any desired step up or step down in rotational velocity may be achieved by changing the number of segments of the commutator. I therefore aim in the appended claims to cover all such changes and modifications as fall within the true spirit and scope of my invention.

What I claim as new and desire to secure by Letters Patent of the United States is:

1. A synchronizing system comprising in combination, a rotatable member, means to rotate said member, means to produce periodic voltage pulses corresponding in time to the instants said member is desired to have predetermined equally-spaced angular positions, means to produce a voltage having value corresponding to the angular position of said member, means whereby said voltage has substantially a single value when the angular position of said member is within a predetermined angle on each side of said predetermined positions, means controlled by said first voltage to produce a second voltage, means whereby said second voltage changes in magnitude during the period when said first voltage has said single value, an energy storage device, and means to charge said storage device only when said pulses coincide in time with the said value of said first voltage and then only to an amount determined by the value of said second voltage at that instant, and means to increase or decrease the rotational velocity of said member in accord with the charge on said device to cause said member to have said predetermined angular positions at the instant of each of said first pulses.

2. A synchronizing system comprising in combination, a rotatable member, means to rotate said member, means to produce periodic voltage pulses corresponding in time to the instants said member is desired to have predetermined equally-spaced angular positions, means to produce a first voltage having value corresponding to the angular position of said member, said last means including a commutator having one condition of conduction for angles less than a particular value on each side of said predetermined position and another condition of conduction at all other angles, means for integrating said first voltage to produce a second voltage increasing in magnitude when said commutator is in said first condition, a capacitor, and means to charge said capacitor only when pulses from said first means coincide in time with said first condition of said commutator and then only to an amount determined by the value of said second voltage at that instant, and means to increase or decrease the rotational velocity of said member in accord with the charge on said capacitor, thus tending to cause said member to have said predetermined angular positions at the instant of each of said first pulses.

3. Means to produce a voltage determined by the voltage of a voltage source at successive instants of time, said means comprising a condenser, a pair of electron discharge devices, each of said devices having a cathode, control electrode, and an anode, the cathode of each of said devices being directly connected to the anode of the other device, said devices being connected in series with said condenser across said voltage source, means to produce a voltage pulse between the control electrodes of said devices and the terminal of said condenser connected to said source at each of said instants of time, said pulse being of voltage value exceeding the maximum voltage of said source, thus to charge said condenser in accord with the voltage of said source at said instants of time.

4. In combination, a rotatable member, means to rotate said member, means to produce periodic voltage pulses corresponding to the instants of time said member is desired to have predetermined equally-spaced angular positions, means to produce a periodic voltage wave varying in accordance with the actual angular position of said member, said voltage wave having a sloping portion such that the instantaneous value of said wave increases for small deviations in said angular position in one direction from said predetermined angular positions and decreases for small deviations in said angular position in the opposite direction from said predetermined angular positions, an energy storage device, means to charge said device in accordance with the value of the sloping portion of said wave at the instant of each of said pulses, said last named means having no charging effect if the angular position of said member deviates from the closest of said predetermined angular positions by more than a predetermined amount, and means to alter the rotational velocity of said member in accordance with the charge of said device, thereby to cause said member to tend to have said predetermined angular positions at the instant of each of said pulses.

5. In a television receiver, the combination of a color filter wheel, a non-synchronous motor for driving said wheel, a source of received synchronizing pulses, means for producing a periodic voltage wave corresponding to the actual rotation of said member, means whereby said periodic wave has a sloping portion in the region of occurrence of said synchronizing pulses, a capacitor, means whereby said periodic wave charges said capacitor in accordance with the value of the sloping portion of said periodic wave at the instants of occurrence of said synchronizing pulses, means whereby said periodic wave is ineffective to charge said capacitor if the instantaneous angular position of said color filter wheel deviates from the closest of said synchronizing pulses by more than a predetermined amount, and means to vary the rotational velocity of said color filter wheel in accordance with the charge on said capacitor.

6. In a television receiver, the combination of a color filter wheel, a non-synchronous motor for driving said wheel, a source of received synchronizing pulses, said pulses corresponding to the instants of time said color wheel is desired to have predetermined equally spaced angular positions, means for producing a periodic voltage wave varying in accordance with the actual angular position of said color wheel, means whereby said voltage wave has a sloping portion such that the instantaneous value of said wave increases for small deviations in the actual angular position of said wheel in one direction from said predetermined angular positions, and decreases for small deviations in the actual angular position of said wheel in the opposite direction, a capacitor, means whereby said periodic wave charges said capacitor in accordance with the value of the sloping portion of said periodic wave at the instants of occurrence of said synchronizing pulses, means whereby said periodic wave is ineffective to charge said capacitor if the actual angular position of said color wheel deviates from the closest of said predetermined angular positions by more than a predetermined amount, and means to vary the rotational velocity of said color filter wheel in accordance with the charge on said capacitor, thereby to cause said wheel to tend to have said predetermined angular positions at the instants of said synchronizing pulses.

7. In a television receiver, the combination of a color filter wheel, a non-synchronous motor for driving said wheel, a source of received synchronizing pulses, said pulses corresponding to the instants of time said color wheel is desired to have predetermined equally spaced angular positions, means for generating a voltage wave varying in accordance with the actual angular position of said color wheel, said last named means including a commutator having one condition of conduction for angles less than a particular value on each side of said predetermined positions and another condition of conduction for all other angles, means for integrating said voltage wave to obtain a second voltage changing in magnitude when said commutator is in said first condition, a capacitor, means to charge said capacitor only when said synchronizing pulses coincide in time with said first condition of said commutator and then only to an amount determined by the value of said second voltage at that instant, and means to vary the rotational velocity of said color wheel in accordance with the charge on said capacitor.

8. In a television receiver, the combination of a color filter wheel, a non-synchronous motor for driving said wheel, a source of received synchronizing pulses, said pulses corresponding to the instants of time said color wheel is desired to have predetermined equally spaced angular positions, voltage generating means controlled by said color wheel for generating a voltage wave varying in accordance with the actual angular position of said color wheel, said voltage generating means including a commutator having a first condition of conduction for angles less than a particular value on each side of said predetermined positions and another condition of conduction for all other angles, wave shaping means to provide a voltage wave changing in magnitude when said commutator is in said first condition, a capacitor, means to charge said capacitor only when said synchronizing pulses coincide in time with said first condition of said commutator and then only to an amount determined by the value of said voltage wave at that instant, and means to vary the rotational velocity of said color wheel in accordance with the charge on said capacitor.

9. In a television receiver, the combination of a color filter wheel, a non-synchronous motor for driving said wheel, a source of received synchronizing pulses, said pulses corresponding to the instants of time said color wheel is desired to have predetermined equally spaced angular positions, voltage generating means controlled by said color wheel for generating first and second voltage waves varying in accordance with the actual angular position of said color wheel, said voltage generating means including a commutator having a first condition of conduction for angles less than a particular value on each side of said predetermined positions and another condition of conduction for all other angles, a first wave shaping means to provide a first voltage wave having a flat-topped portion when said commutator is in said first condition and a second wave shaping means to provide a second voltage wave changing in magnitude when said commutator is in said first condition, a capacitor, means to charge said capacitor only when said synchronizing pulses coincide in time with said first condition of said commutator and then only to an amount determined by the value of said second voltage at that instant, and means to vary the rotational velocity of said color wheel in accordance with the charge on said capacitor.

ROBERT F. WOOD.

REFERENCES CITED

The following references are of record in the file of this patent:

UNITED STATES PATENTS

| Number | Name | Date |
|---|---|---|
| 2,229,964 | Dome | Jan. 28, 1941 |
| 2,319,789 | Chambers | May 25, 1943 |
| 2,329,194 | Goldmark | Sept. 14, 1943 |
| 2,350,008 | Artzt | May 30, 1944 |
| 2,351,760 | Beers | June 20, 1944 |
| 2,378,746 | Beers | June 19, 1945 |
| 2,383,360 | Artzt | Aug. 21, 1945 |
| 2,399,421 | Artzt | Apr. 30, 1946 |
| 2,428,946 | Somers | Oct. 14, 1947 |

FOREIGN PATENTS

| Number | Country | Date |
|---|---|---|
| 117,021 | Australia | June 3, 1943 |